Aug. 11, 1925.

O. B. PULIS 1,549,607

FASTENING DEVICE FOR WALL FORM PLATES

Filed June 12, 1922      2 Sheets-Sheet 1

Inventor:
O. B. Pulis

By Robb, Robb & Hill

Attorneys

Aug. 11, 1925.
O. B. PULIS
1,549,607
FASTENING DEVICE FOR WALL FORM PLATES
Filed June 12, 1922     2 Sheets-Sheet 2
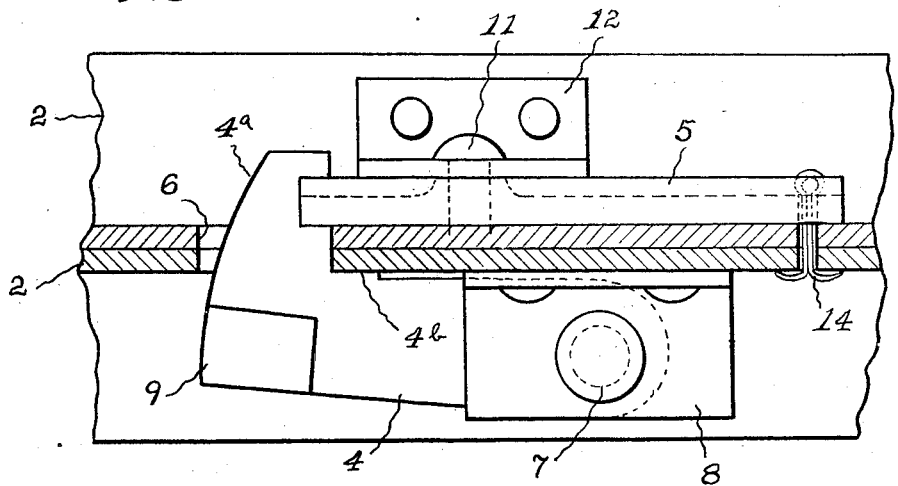
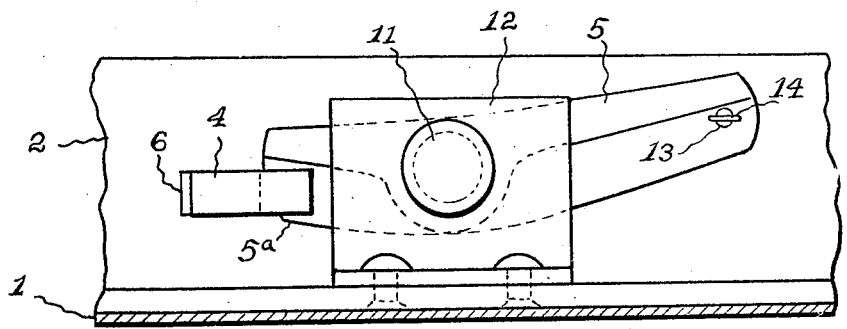
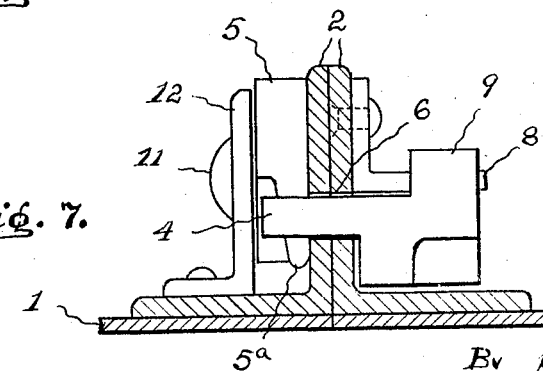
Inventor:
O. B. Pulis
By Robb, Robb & Hill
Attorneys Patented Aug. 11, 1925.

1,549,607

UNITED STATES PATENT OFFICE.

OSCAR B. PULIS, OF MILWAUKEE, WISCONSIN, ASSIGNOR TO METAL FORMS CORPORATION, OF MILWAUKEE, WISCONSIN, A CORPORATION.

FASTENING DEVICE FOR WALL-FORM PLATES.

Application filed June 12, 1922. Serial No. 567,848.

*To all whom it may concern:*

Be it known that I, OSCAR B. PULIS, a citizen of the United States, residing at Milwaukee, in the county of Milwaukee and State of Wisconsin, have invented certain new and useful Improvements in Fastening Devices for Wall-Form Plates, of which the following is a specification.

The present invention relates to a fastening device for connecting adjacent sections or units of a wall form, and holding the said wall form units rigidly together and in proper alignment with each other when the units are assembled for use.

Among the objects of the invention are to provide a fastening device of this character, which enables wall form sections or units to be quickly fastened together or disassembled without the use of any special tools, and which holds adjacent wall form units rigidly and securely in proper position when they are assembled for use.

A further object of the invention is to provide a fastening device of this character which may be confined entirely within the marginal portions or edges of the wall form plates when not in use, thereby avoiding projecting parts which are liable to be accidentally broken, and enabling the wall form units to be stacked closely upon each other and readily packed or stored in a minimum amount of space when not in use.

The fastening device is more especially adapted for use upon different types of standardized metal wall forms, although it will be understood that the invention is not necessarily restricted to use in connection with such forms but that it can be employed upon any kind of a form and for connecting the abutting edge portions of any analogous members.

With the above and other objects in view, the invention consists in certain constructions and combinations of the parts as will more fully appear as the description proceeds, the novel features thereof being pointed out in the appended claims.

For a full understanding of the invention reference is to be had to the following description and accompanying drawings, in which, Figure 1 is an elevation of a fragmentary portion of a panel comprising three rectangular units which have been assembled and locked together by the improved fastening means.

Figure 5 is an enlarged detail view of a fragmentary portion of abutting form units showing the complemental locking members of the two units in operative engagement with each other, portions being shown in section.

Figure 6 is an enlarged transverse sectional view through a portion of one of the wall forms, showing the latch locking member as in operative engagement with the projecting end of a latch member on an adjacent form.

Figure 7 is a transverse sectional view through the abutting edge portions of a pair of wall forms, showing the complemental locking members in operative position.

Throughout the following description and on all of the views of the accompanying drawings corresponding parts are designated by like reference characters.

Figure 1:
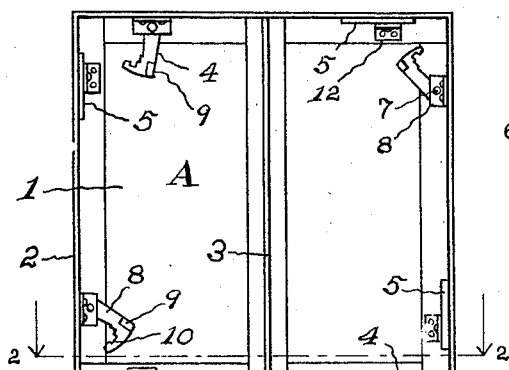
Figure 2:
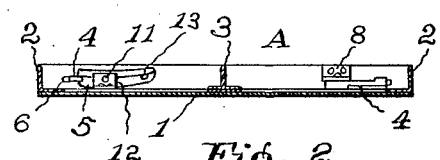
Figure 2 is a transverse sectional view on the line 2—2 of Figure 1, looking downwardly.
Figure 3:
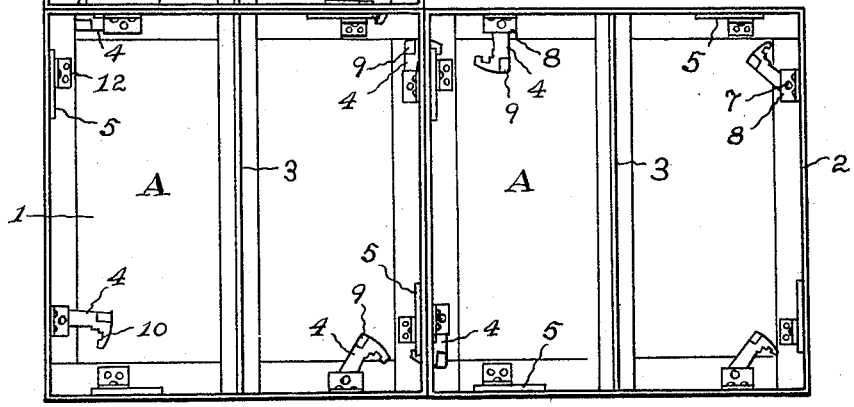
Figure 3 is an enlarged detail view of one of the latch locking members.
Figure 4:
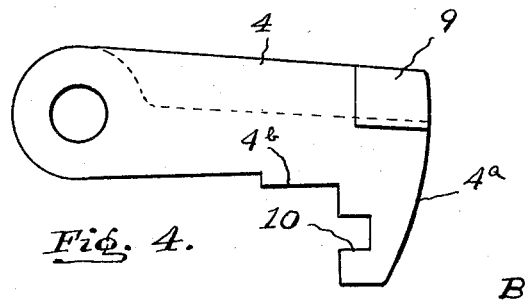
Figure 4 is a similar view of one of the latch members.

For the purpose of illustration the fastening device is shown as applied to a standard and well known construction of metal wall form. These forms are constructed in units or sections which are adapted to be used interchangeably, and which can be assembled in different relations, according to the requirements of the particular piece of work which is being done. These wall form units or plates are each designated as an entirety by the reference character A, the units being rectangular in shape and of a corresponding size, so that they can be readily assembled into a complete wall form of any desired extent or size. Each unit comprises a body plate 1 provided at the edges thereof with rearwardly extending marginal flanges 2, which are provided by securing angle iron strips to the edges of the plate. A stiffening flange 3 extends across the back of each of the wall form units A in one direction, being arranged at substantially a median line. These stiffening flanges 3 may be conveniently formed of T iron as shown. Metal wall forms constructed in this manner are very well known in the art, having been extensively manufactured and sold, and no claim to novelty is based thereon at this time.

Each of the corners of each of the units A is provided at one side thereof with a swinging latch member 4, and at the other side thereof with a complemental latch locking member 5. The latch members 4 and the latch locking members 5 are arranged progressively around the periphery or margin of the unit, so that when two of the units are brought together the latch locking members 5 of each unit will be in position to engage the latch members 4 of the other unit.

The latch members 4 are mounted to swing in the plane of the wall form unit and the marginal flanges 2 are formed with openings 6 through which the latch members are caused to protrude preparatory to being engaged by the wedge shaped ends 5ª of the latch locking members 5. Each latch member 4 is pivoted upon a pivot pin 7 which connects an outstanding bracket 8 on the marginal flange 2 to the base of the angle iron strip providing the marginal flange. The swinging end of the latch member is provided with an outstanding lug 9 which is adapted to be engaged by the fingers or by a suitable tool when swinging the latch member into and out of operative position. The swinging end of the latch member 4 is also formed with a laterally projecting arm 4ª which is adapted to be projected through the opening 6 when the latch member is swung outwardly toward the marginal flange 2, and this arm 4ª is formed with a notch 10 adapted to be engaged by the latch locking member 5 of an adjacent wall form unit to wedge the marginal portions of the two units tightly together and retain them in such a relation while the units are assembled to provide a wall form. At a point adjacent to the base of the arm 4ª the latch member 4 is provided with a boss or seat 4ᵇ which is arranged to obtain a bearing upon the inner face of the flange of the form unit when the latch member is swung into operative position. The lateral arm 4ª of the latch member is then projected through the opening 6 of the form unit and is in position to engage the opening 6 of another form unit in such a manner as to align the two units. By swinging the wedge shaped end of the latch locking member 5 of the other unit into engagement with the notch 10 the two units can be tightly wedged and clamped.

The latch locking members 5 swing at right angles to the plane of the wall form units, being pivotally mounted on pins 11 extending between the marginal flanges 2 of the form units and outstanding brackets 12 which are arranged in a spaced and parallel relation to the marginal flanges, one end of each of the latch locking members 5, as previously explained, is formed with a wedge shaped portion 5ª which is adapted to engage the notch 10 of a latch member 4 and cooperate therewith to wedge the abutting edges of the two form units tightly together. The opposite end of each of the latch locking members 5 provides a lever for swinging the latch locking member into and out of operative position, and is provided with an opening 13 which is adapted to register with corresponding openings in the marginal flanges of adjacent form units when the latter are assembled. These several openings register when the latch locking member is swung into operative position, and a cotter pin 14 or like member can then be inserted through the openings for the purpose of securing the latch locking member in operative position and rendering it impossible for the parts to become accidentally disengaged when the form units are assembled and set up for use.

When the latch members and latch locking members are not in use they can all be moved inwardly, so as to be positioned entirely within the marginal portions of the wall form units, thereby avoiding projecting portions which are liable to be broken, and enabling the form units to be packed closely together or piled readily upon each other when not in use. The complemental fastening members and opening 6 in the marginal flanges 2 are correspondingly arranged in all of the units so that when any two of the units are brought together the openings 6 formed in the marginal flanges toward opposite ends thereof are in registry. The latch member 4 of each of the units is moved to cause the arm 4ª at the end thereof to project through the openings 6 of the two marginal flanges so that it can be engaged by the latch locking member 5 of the other form unit. These latch locking members have a wedge engagement with the notches 10 of the latch members and cooperate therewith, as will be readily apparent, to draw the adjacent edges of the units A tightly together and to hold them in such a position. If desired, this locking relation can be positively maintained by inserting the cotter pins 14 in position. When the wall form units A are thus assembled the working faces thereof are all substantially in the same plane, so that the assembled wall form presents a continuous and smooth working face. The arrangement and construction of the fastening devices is such that the wall form units A can be readily assembled in any desired relation, and the fastening members can be readily manipulated without any special tool. It may furthermore be noted that the fastening members are permanently connected to the units A so that they are always in position for use, and there is no possibility of the fastening members becoming misplaced or lost.

Having thus described my invention what I claim as new and desire to secure by Letters Patent is:

1. A fastening device for form units of the character described, including interlocking complemental fastening elements mounted in corresponding positions upon the units both fastening elements being movable and arranged to be retracted entirely within the units when not in use.

2. A fastening device for form units of the character described, including complemental fastening elements which are correspondingly mounted upon the units and arranged to swing about axes at angles to each other.

3. A fastening device for form units of the character described, including interlocking complemental latch members and latch locking members which are both movably mounted at corresponding positions upon the respective units.

4. A fastening device for form units of the character described, including complemental fastening elements which are mounted upon the units in corresponding positions and each movable in a certain plane, said fastening elements being adapted to be completely retracted within the border limits of the respective units and cooperating with each other to hold the units together when the fastening elements are operatively engaged.

5. A fastening device for form units of the character described, including complemental fastening elements which are mounted upon the units in corresponding positions and movable in angularly disposed planes, said fastening elements being adapted to be retracted within the border limits of the respective form units and cooperating with each other to hold the form units together when they are in operative engagement.

6. A fastening device for form units of the character described, including complemental fastening elements which are movably mounted upon their respective units, and means for locking the fastening members in operative engagement with each other.

7. A fastening device for form units having marginal flanges, including a latch member upon one of the units and a complemental latch locking member mounted upon the other unit, the marginal flanges being formed with corresponding openings through which the latch member is adapted to be projected for engagement by the latch locking member.

8. A fastening device for form units having marginal flanges, including a latch member mounted upon one of the units and arranged to swing in the plane thereof, and a latch locking member mounted upon the other unit, the marginal flanges being formed with corresponding openings through which the latch member is adapted to be projected for engagement by the latch locking member.

9. A fastening device for form units having marignal flanges, including a latch member pivotally mounted upon one of the units and arranged to swing in the plane thereof, and a latch locking member mounted upon the other unit and swinging in a plane at right angles thereto, the marginal flanges of the units being formed with corresponding openings through which the latch member is adapted to be projected for engagement by the latch locking member.

10. A fastening device for form units having marginal flanges, including a latch member pivotally mounted upon one of the units and having a notched portion in the end thereof, and a wedge shaped latch locking member mounted upon the other unit, the marginal flanges being formed with corresponding openings through which the latch member is projected preparatory to engaging the notched end thereof with the wedge shaped latch locking member to clamp the units tightly together.

11. A fastening device for form units having marginal flanges, including a latch member mounted upon one of the units, a bracket projecting from the marginal flange of the said unit, the latch member being pivotally mounted between the said bracket and the face of the unit and swinging in the plane of the unit, a latch locking member mounted upon the opposite unit, a bracket projecting from the unit in a spaced relation to the marginal flange, the latch locking member being pivotally mounted between the bracket member and the marginal flange, and the marginal flanges being provided with corresponding openings through which the latch member is adapted to be projected preparatory to engaging it with the latch locking member.

12. The combination with a pair of flanged form units having corresponding openings in the flanges thereof, of a pivotally mounted latch member carried by one of the units and formed with a lateral arm adapted to be projected through the aligned openings, the lateral arm being notched and the latch member being provided with a flange engaging seat at the base of the arm, and a wedge shaped locking member carried by the other unit and adapted to engage the notch of the arm to clamp the two units tightly together.

13. A fastening device for form units of the character described, including a latch member pivotally mounted upon one of the form units, a cooperating wedge member pivotally mounted in a corresponding position on another of the form units, the latch member and wedge member being adapted to be retracted within the border limits of the respective form units and cooperating with each other to hold the form units together when they are in operative engagement.

In testimony whereof I affix my signature.

OSCAR B. PULIS.